United States Patent
Bultel et al.

[11] Patent Number: 6,139,050
[45] Date of Patent: Oct. 31, 2000

[54] SAFETY DEVICE FOR MOTORCYCLISTS

[76] Inventors: Alain Bultel, 9, rue Denis Papin, F-38130 Echirolles; Frederic Clément, 26, rue de la Gare, F-38120 Saint Egreve, both of France

[21] Appl. No.: 08/981,112

[22] PCT Filed: Jun. 20, 1996

[86] PCT No.: PCT/FR96/00953

§ 371 Date: Mar. 12, 1998

§ 102(e) Date: Mar. 12, 1998

[87] PCT Pub. No.: WO97/00624

PCT Pub. Date: Jan. 9, 1997

[30] Foreign Application Priority Data

Jun. 21, 1995 [FR] France ..................... 95 07402

[51] Int. Cl.[7] ............................. B60R 21/22; B60R 21/32
[52] U.S. Cl. ........................... 280/730.1; 280/735
[58] Field of Search ..................... 280/730.1, 734, 280/735; 439/353, 348

[56] References Cited

U.S. PATENT DOCUMENTS

| | | | |
|---|---|---|---|
| 3,343,852 | 9/1967 | Blight et al. | 285/82 |
| 4,984,821 | 1/1991 | Kim et al. | 280/728 |
| 5,277,627 | 1/1994 | Matsuzaki | 439/677 |
| 5,343,394 | 8/1994 | Takeuchi et al. | 280/735 |
| 5,362,098 | 11/1994 | Guill . | |
| 5,430,432 | 7/1995 | Camhi et al. | 340/438 |
| 5,500,952 | 3/1996 | Keyes | 2/465 |
| 5,564,743 | 10/1996 | Marchant | 280/736 |
| 5,593,111 | 1/1997 | Jackson et al. | 244/110 D |
| 5,686,883 | 11/1997 | Mutoh et al. | 340/426 |
| 5,746,442 | 5/1998 | Hoyaukin | 280/730.1 |

FOREIGN PATENT DOCUMENTS

| | | |
|---|---|---|
| 0051254 | 5/1982 | European Pat. Off. . |
| 1503483 | 3/1978 | United Kingdom . |
| 1524022 | 9/1978 | United Kingdom . |
| 1588919 | 4/1981 | United Kingdom . |

*Primary Examiner*—Brian L. Johnson
*Assistant Examiner*—Joselynn Sliteris
*Attorney, Agent, or Firm*—Duane, Morris & Heckscher LLP

[57] ABSTRACT

A safety device for a motorcyclist by instantaneously inflating a suit constituting an air bag for cushioning the effects of a fall. Sensors (2, 3, 3a, 4, 5, 6) are connected to a microprocessor (1) which sends an inflation signal in the presence of certain operating parameters of the vehicle, and in particular when the motorcyclist is ejected.

9 Claims, 5 Drawing Sheets

SAFETY DEVICE FOR MOTORCYCLISTS

The present invention relates to a safety device for a motorcyclist, whether the driver or the passenger of a motorbike, and also for the motorbike itself.

In order to improve safety in cars, it is now known to make use of an "air bag" device. In the event of an impact, this is detected by a control unit which triggers automatic inflation of a bag by firing a pyrotechnic capsule that releases a supply of compressed air. Inflation takes place in a time of about 9 thousandths of a second thereby making it possible to avoid injury from the impact.

A device of that kind cannot be envisaged for a motorcyclist, whether a driver or a passenger, given the structure of the vehicle. In a car, in the event of an impact, passengers wearing safety belts remain inside the bodywork, whereas on a motorbike riders are ejected. They strike the ground after being thrown through the air to a greater or lesser extent. Contact with the ground can sometimes be fatal, given the speed, and always gives rise to injury.

An object of the present invention is to mitigate that drawback and to avoid fatal contact.

Proposals have already been made in U.S. Pat. No. 4 984 821 to provide a motorcyclist with a suit that is inflatable, in full or in part. In the event of an accident, if the motorcyclist is ejected, a cord actuates a contactor which triggers firing of a pyrotechnic capsule, thereby releasing air under pressure which inflates the suit. Nevertheless, that very simple system is of limited scope concerning safety, and in particular, the motorcyclist must remember to put the device into operation by means of a switch.

According to the present invention, a motorcyclist's safety device comprising an inflatable suit that comes between the motorcyclist and the ground with inflation of the suit being triggered by a pyrotechnic capsule, is characterized in that the following are provided:

on the motorcycle, an electronic control unit connected to detectors;

a on the suit, means for causing the suit to inflate; and a connection between the control unit and the suit, firing of the capsule being the result of the connection rupturing, thereby sending a signal issued by the control unit to the firing device.

Thus, from the moment a rider (driver and/or passenger) is ejected from a motorcycle, the suit inflates. The driver and the passenger are connected to the motorbike by a safety connection. In the event of a fall, if the driver is ejected, then the passenger generally is also ejected, and under such circumstances the chambers of the suits inflate. If only the passenger is ejected, then only the passenger's suit inflates. The inflation command thus comes from detecting a contactor integrated in the safety connection. When the connection is separated into two portions under action from a determined force, namely a motorbike portion and a suit portion, the contactor detects this separation and sends information to the control unit indicating that the connection or hook has separated. In turn, and as a function of conditions that are defined below, the control unit issues a command to the suit by means of a radio or other signal, ordering a first pyrotechnic capsule to explode, optionally followed, after a length of time that varies as a function of speed, by a second command for ordering a second pyrotechnic capsule to explode. In another embodiment, it is the rupture itself of the connection, under the action of a calibrated force, that triggers firing. In both cases, it is rupture of the connection that gives rise to firing and to inflation.

Other characteristics and advantages of the invention appear from the following description of a particular embodiment given purely by way of non-limiting example, and with reference to the figures, in which.

Figure 1:
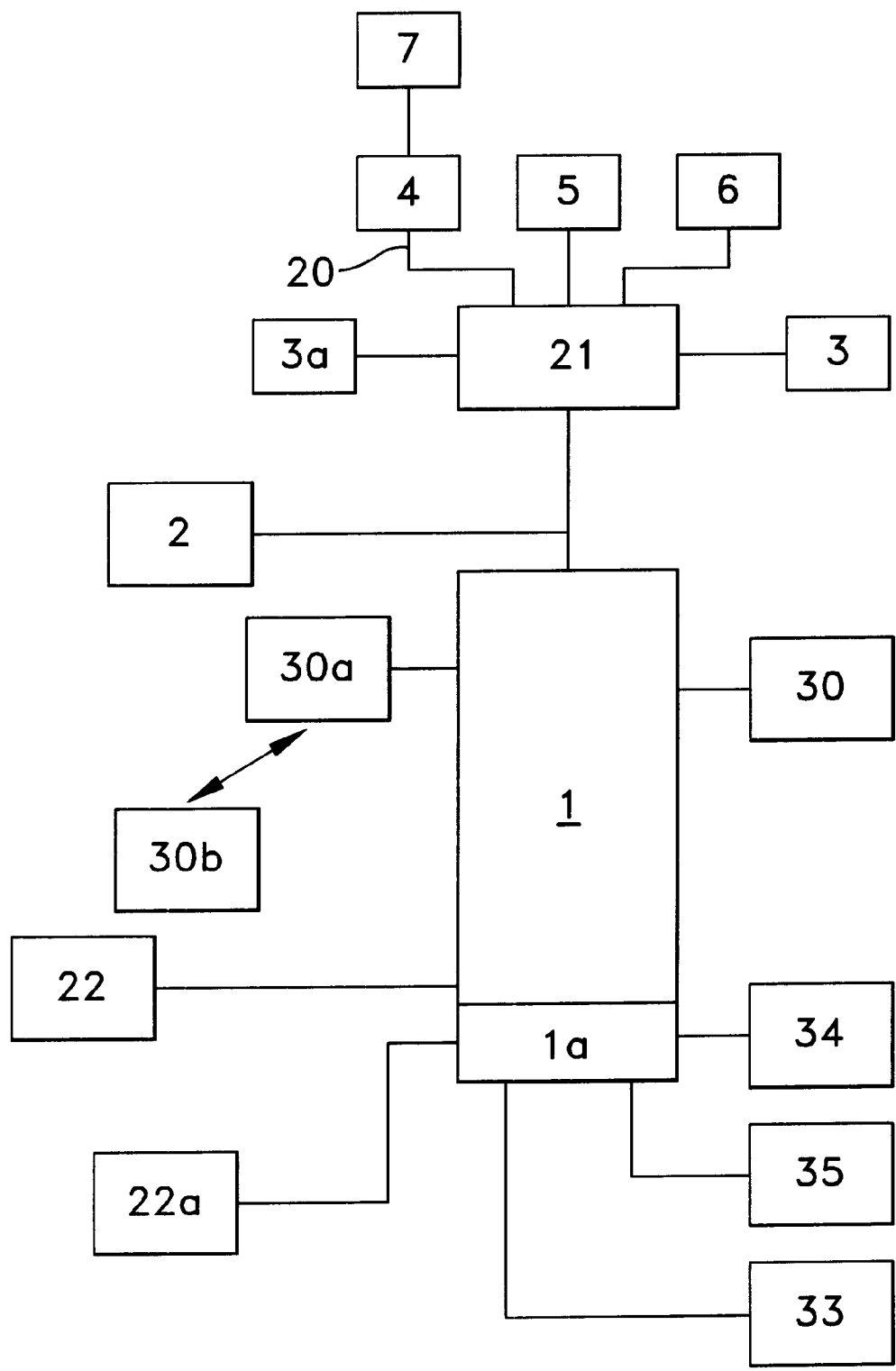
FIG. 1 is a block diagram of the control unit on the motorbike, and of its peripheral elements.

The electronic control unit 1' including a microprocessor 1T and a processing stage 1a is secured to the structure of the motorcycle, e.g. beneath the saddle. The control unit is preferably contained in a box of plastics material that is not brittle, or flammable, or sensitive to water spray, to humidity, or to heat. This microprocessor 1 is connected: to the coil 2 of the motorbike, to a revolution counter 3 disposed on a wheel, to a tilt detector 3a, to buckle detectors or connections 4, 5, and 6 for detecting the presence of at least one passenger on the motorbike, to the key 22a, and to a relay 22. The connection to the coil 2 indicates whether the engine is running, and the wheel revolution counter 3 indicates whether the motorbike is moving. Both of these conditions must be present for the safety device of the invention to operate. It must be possible for the driver and the passenger to be able to disconnect themselves at rest without the inflatable chambers inflating. The wheel revolution counter 3 enables the speed of the vehicle to be computed, and it is as a function of said speed that the two above-mentioned explosions will take place. The higher the speed, the greater the need for corresponding cushioning, and consequently for the chambers of the suit to be inflated. However a single explosion giving rise to determined inflation of the suit may suffice.

The microprocessor 1 is also connected via a link (card) 21 to buckle connections 4, 5, and 6 enabling one or more suits 7 to be connected to the control unit. The driver is connected via connection 4, when there is a passenger, the connection passes via a connection 5, and for a side car, a third connection 6 is provided. These connections constitute detectors for detecting the presence of one, two, or three people on the motorbike. It is possible to program the microprocessor 1 so that the motorbike cannot be started until at least one connection is locked, which would impose the wearing of an inflatable suit in order to ride the bike, as with certain seat belts. The inputs of 3, 3a, 4, 5, and 6 are connected to the microprocessor 1 via a link (card) 21. In the event of an accident, the microprocessor will know which person or people has/have been ejected by identifying which connections have been ruptured. It is only the separation signal that triggers inflation of a suit, since it is possible for the motorbike to continue running for a certain length of time, still generating pulses for 2 and 3.

The microprocessor 1 may also be connected to a transmitter 30 for transmitting a firing signal to one of the suits. It may also be connected, where necessary, to an RS 232 type link 33 of an alarm 34 such as a siren, and to a visible indicator 35, that performs functions which are described below.

The presence of a microprocessor 1 in the control unit 1' makes it possible to fit the motorbike with an antitheft device, in which case the control unit also includes a receiver 30a capable of receiving a signal transmitted by an infrared remote control 30b which unlocks either the power supply to the coil or the fuel supply to the engine via the relay 22, assuming that closure of the power supply contact gives rise to that kind of inhibition. Naturally, the key 22a is connected in parallel with the infrared control 30b.

Figure 2A:
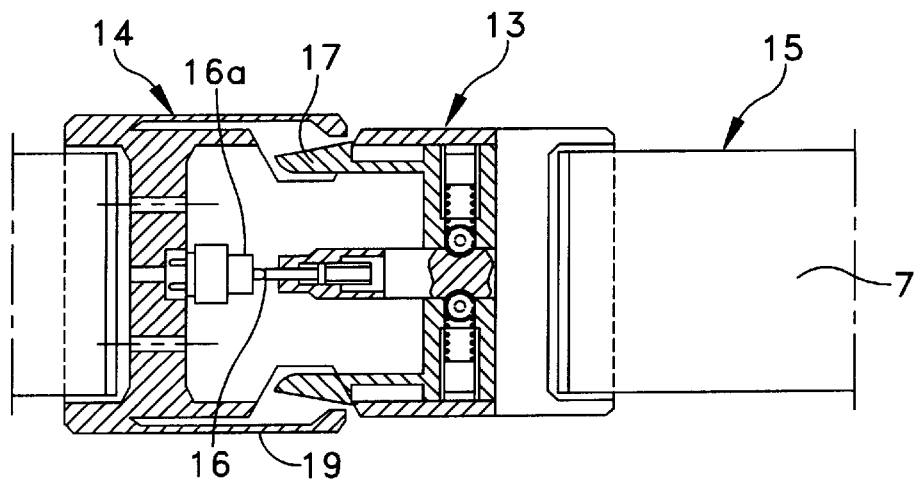
FIGS. 2a to 2c show the connection between the motorbike and the suit in three operating configurations.
Figure 2B:
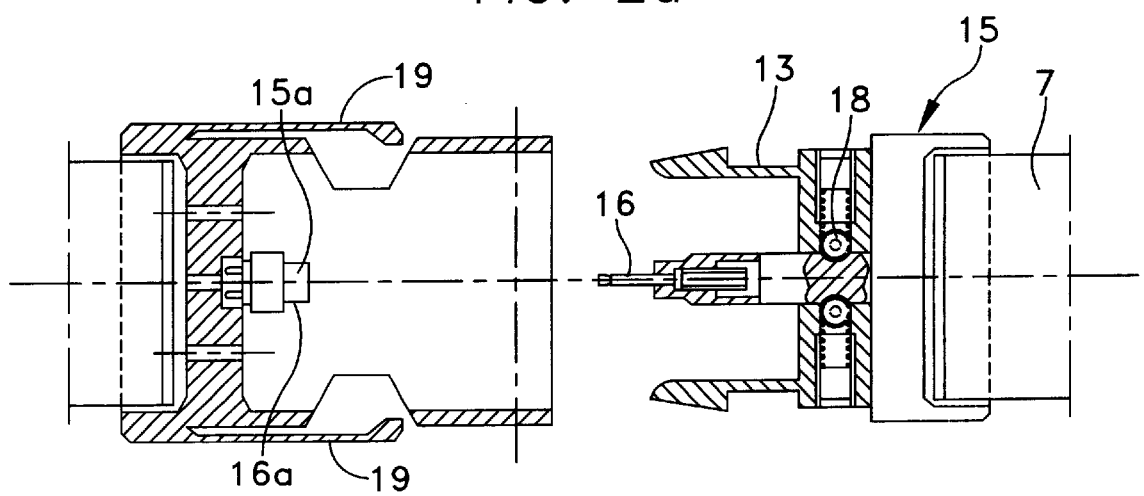
Figure 2C:
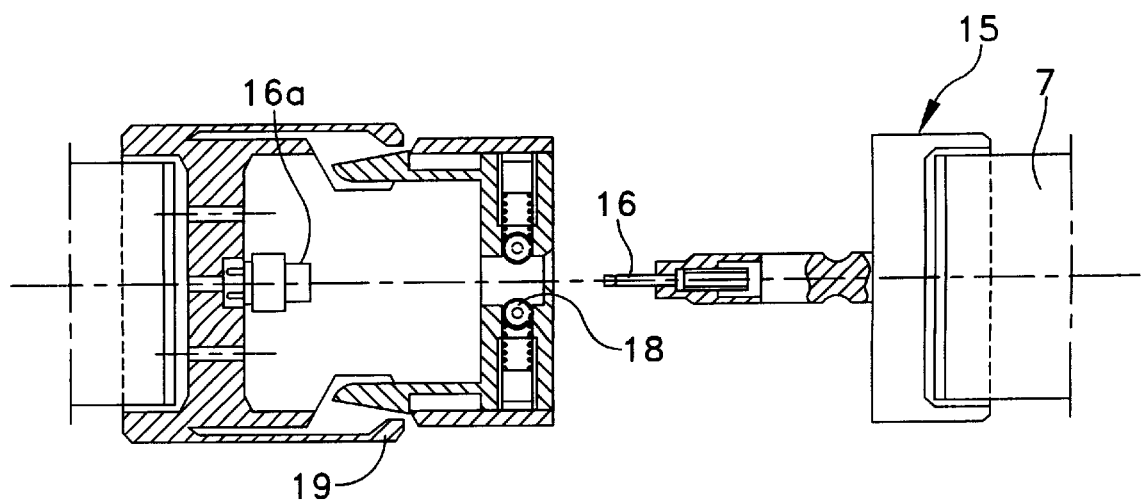

As can be seen in FIGS. 2a to 2c, a connection 4, 5, or 6 is made up of three elements: a female type element 14 connected to the motorbike; a male type element 15 connected to the suit; and between them an intermediate element 13. The intermediate element 13 carries male contact or 16 capable of being inserted in a female contactor 16a. FIG. 2a shows a connection while the driver is riding; FIG. 2b shows the same connection when the driver is separated normally from the motorbike; and FIG. 2c shows the connection separated into two parts in the event of an impact or an accident during which the driver (or a passenger) is ejected from the machine.

In FIG. 2a, the male part 15 is snapped in the female part 14 by hooks 17. Relatively slow manual traction makes it possible to release the intermediate part 13 from the female part 14 by pressing against the hooks 17 by means of the arms 19. This leads to the position shown in FIG. 2b where the driver can dismount from the machine, the male contactor 16, still carried on the male part 13. In any event the wheel revolution counter 3 makes it impossible at this moment for firing to take place since it indicates that the vehicle is stationary, even if its engine is still running.

In contrast, in the event of sudden ejection, the intermediate part 13 remains captive in the female portion 14 and the suit 7 tears the male contactor 16 from its female contactor 16a. This is the case shown in FIG. 2c. The male contactor 16 which was initially held by balls 18 loaded by calibrated springs slides over the balls and breaks contact with female contactor 16a, which information is conveyed to the microprocessor 1 by line 20. The transmitter 30 then sends a signal which is picked up by the suit and triggers inflation of its chambers. The connections 5 and 6 are of the same type as connection 4, and they operate in identical manner.

Figure 3:
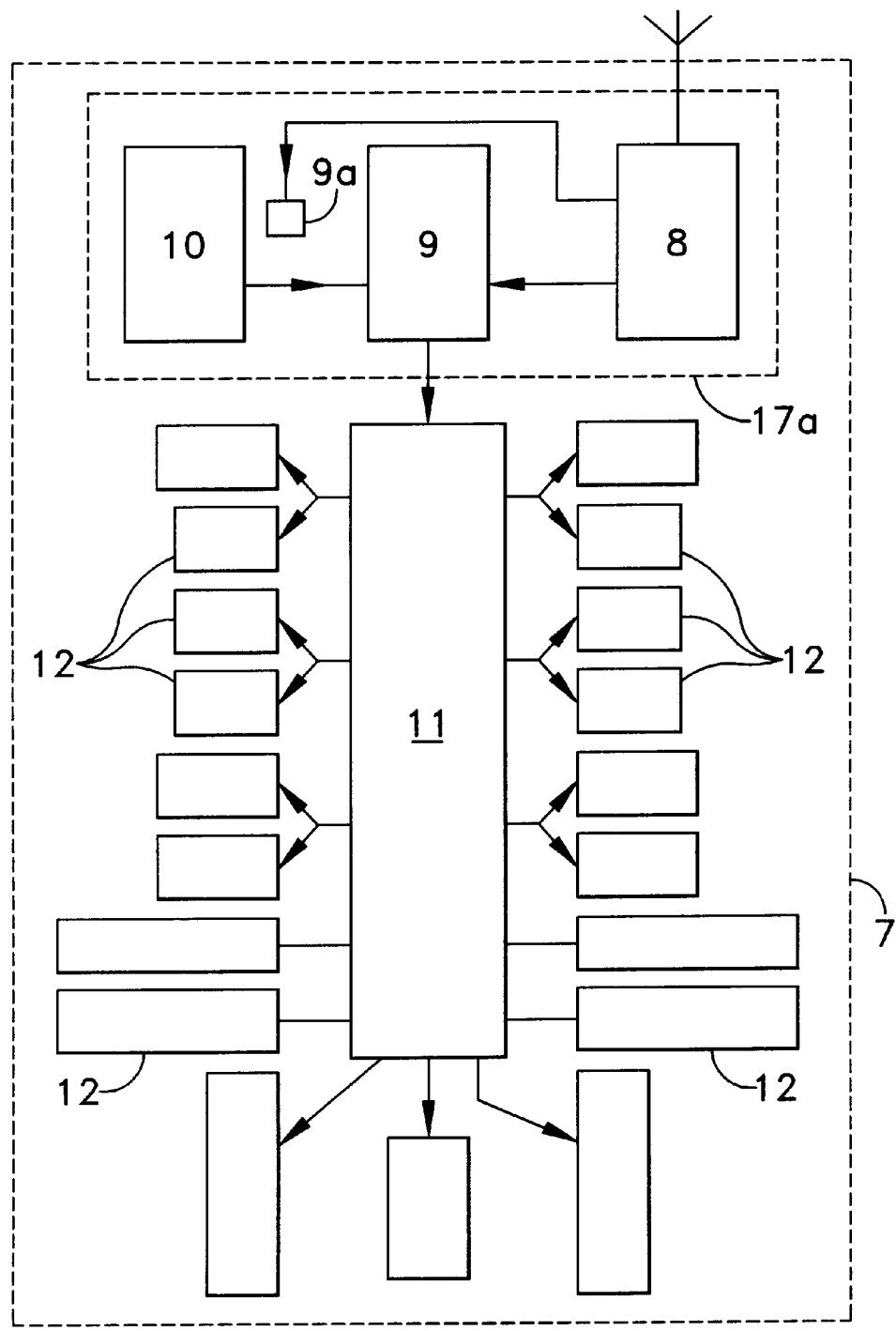
FIG. 3 is a diagrammatic view of the suit.

As shown in FIG. 3, the suit 7 includes a receiver card 8 receiving signals from the control unit 1' in the event of the connection 4 being ruptured. The receiver card 8 controls a pyrotechnic system 9a directly. The pyrotechnic system is connected to a cylinder 10 of compressed air followed by an expander for dropping pressure from 200 bars to 8 bars after a time lapse that may depend on the speed of the vehicle at the moment of ejection, which speed is computed by the control unit as a function of pulses from the wheel revolution counter 3. The transmitter can send a second signal to the card 8 to act directly on a valve included in the stage 9 and close the passage for air to the distributor. The set of elements 8, 9, 9a, and 10 is included in a waist bag 17a worn by the motorcyclist and possibly by the passenger. The air cylinder is connected, after 9a has exploded, to an air distributor 11 for distributing air through the various chambers 12 provided in the suit. These chambers are fitted with non-return valves (not shown) isolating them from one another such that if one of the chambers should be punctured during or before collision, the others continue to provide suitable protection.

From end to end of the body there are provided a corolla chamber, a tibia chamber, two femur chambers, an ulna chamber, a radius chamber, a chamber for the ribs, and the sternum, a chamber for the ribs and the lumbar vertebrae, and a chamber for the humerus and the collar bone. A single chamber is provided for protecting the cervical vertebrae. In the example shown, the suit, which is preferably made of leather, is provided with 19 chambers. The head is naturally protected by the helmet. As with an air bag, it takes abut 9 thousandths of a second to inflate the chambers, thereby enabling them to be inflated before striking the ground. The 19 chambers serve solely to reduce major risk of external lesions such as: the rib cage being forced in, fracture of the spine, or of the neck vertebrae, or any open fracture of the upper or lower limbs. The receiver 8, the pyrotechnic capsules, the expander, and the cylinder 10 are contained in a fiberglass shell and are protected from one another by polyurethane foam.

Figure 4:
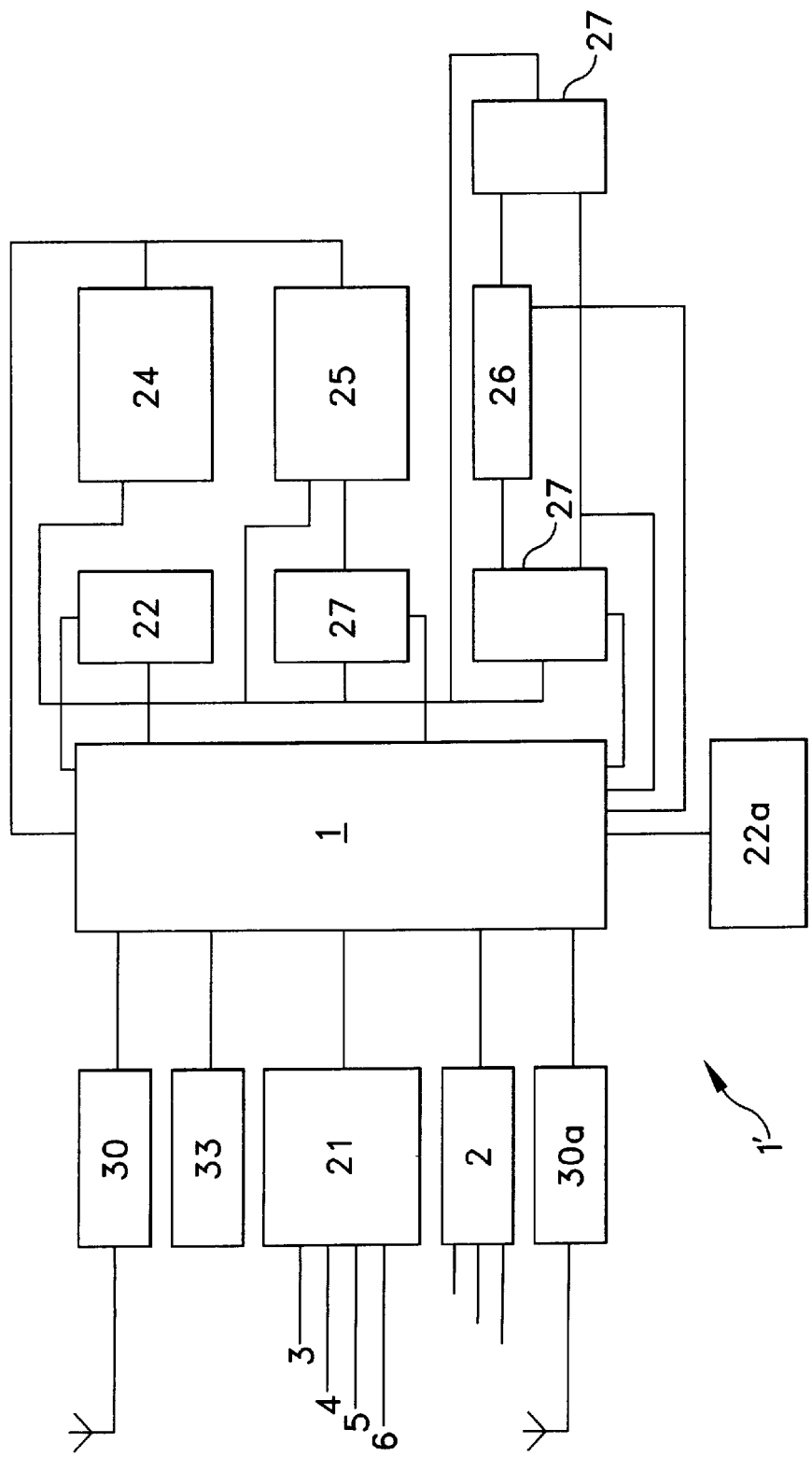
FIG. 4 is an electronic block diagram showing operation of the control unit.

FIG. 4 is a diagram of the electronics used in an embodiment of the invention. The electronics of the control unit comprises two cards, a card 21 carrying the analog portion and the inputs/outputs, and a card carrying the digital portion. The digital portion comprises various integrated circuits and a microprocessor 1 associated with EPROM memory 24 including the program, a random-access memory 25 for managing data, and a encoder/decoder 26. Gates 27 enable or inhibit data communication. A relay 22 serves to act mechanically on a control member of the motorbike. When the system is in operation and the motorcyclist decides to stop, the engine is switched off with the key, and at that moment the microprocessor 1 no longer receives pulses from the coil 2. It also knows that the motorbike is no longer running since the wheel revolution counter 3 is not sending pulses either. The pulses from the coil 2 enable the microprocessor 1 to recognize whether the motorbike has a two-stroke engine or a four-stroke engine. It is thus possible to calculate easily the number of revolutions per minute. From that moment, the motorcyclist can release the safety connection 4 without any risk of the system inflating the chambers in the suit. The circuit applies information to the random access memory 25 concerning bike travel. When starting again, the motorcyclist presses on the button of the electronic key which may be reciever 30a (FIG. 1).

Once the code has been transmitted, with the alarm system at rest, the control unit 1' passes from the reception position to the transmission position to prepare the device for transmission in the event of a problem. The motorcyclist then inserts the male part 15 into the female part 14 of the connection (FIG. 2) and the microprocessor 1 knows that one or two passengers are connected to the motorbike and, in that case, it allows various members that were previously switched off to be switched back on. The motorcyclist can then start with the starting date and time being stored in the random access memory 25; the motorcyclist then setting out to travel from a point A to a point B; and all the time the motorbike is travelling the RAM stores the greatest value as a function of the first revolution of the wheel at minimum, medium, and maximum speeds of the motorbike on the basis of pulses coming from the wheel revolution counter 3. The duration of inflation is proportional to maximum speed and is obtained by continuously taking said value into consideration. If an accident arises during travel, and the driver and/or passenger are ejected from the motorbike, the microprocessor detects that a pin has been grounded for the driver and another pin for the passenger, and as a function of motorbike speed it sends a start-inflation code. By means of a radio system, the first pyrotechnic capsule 9a explodes (see FIG. 3) and releases the compressed air from the cylinder 10 into the 19 chambers. Thereafter the microprocessor applies the stop code, still in the same manner, thereby causing the second capsule 9 to explode, thereby closing the air circuit. The microprocessor records in the random access memory 25 various data items relating to the accident.

The use of a microprocessor system makes it possible to store a large amount of information, and possibly to play it back via an RS 232 type outlet 33 (FIG. 1), e.g. to a Minitel (registered trademark) or a computer, for inspection purposes by an insurance company. Naturally, such a system can serve as an alarm in the event of theft being detected. To this end, an alarm system may include a siren 34, and it is possible to switch off the fuel feed via an electrically controlled valve (not shown), and also the power supply to the coil after a determined time lapse by means of the relay 22.

Figure 5:
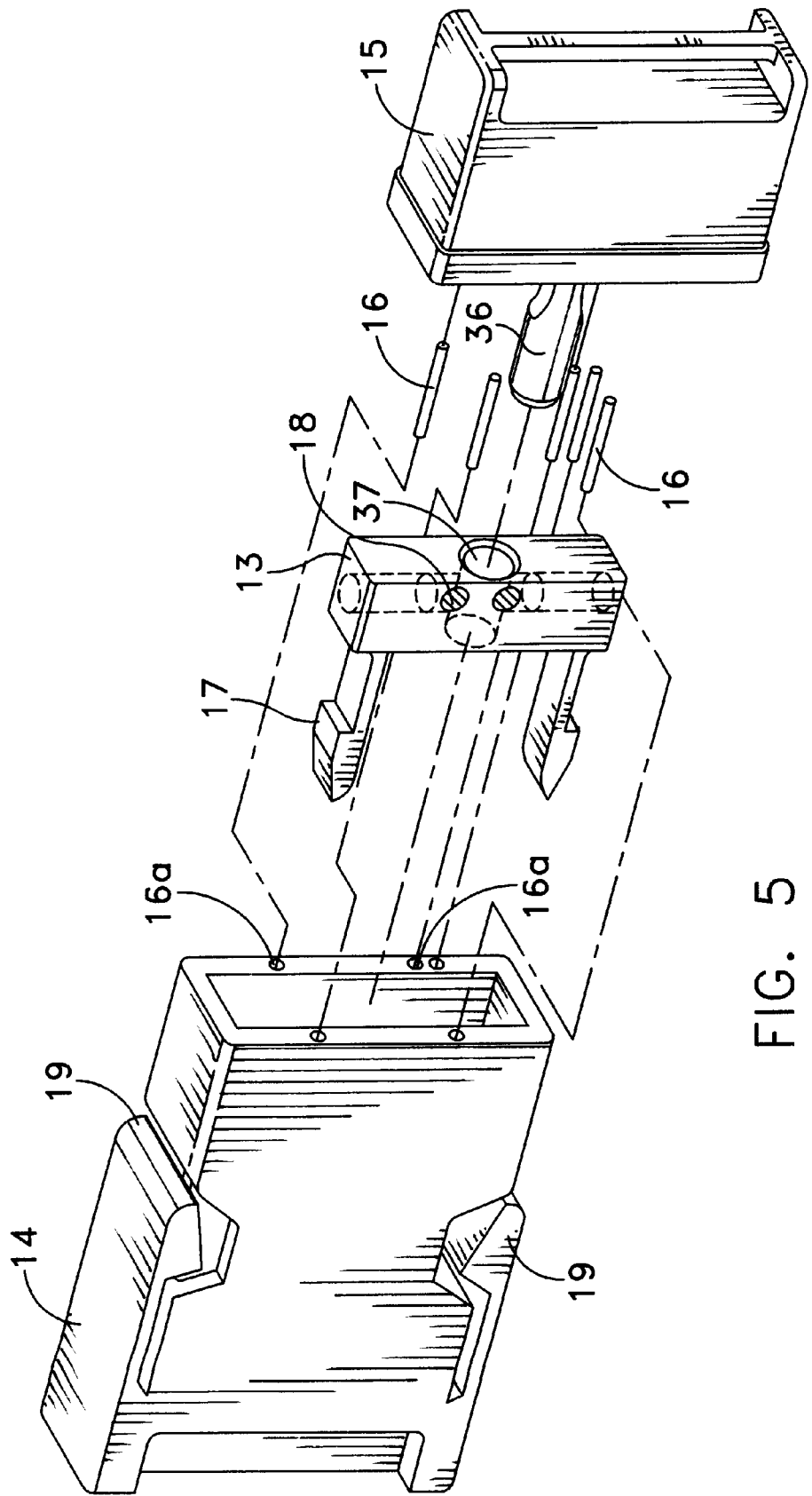
FIG. 5 shows another embodiment of the connection.

In the example given above, firing is triggered by a radio signal from the motorbike to the suit. The signal is simple and robust. Nevertheless, in certain cases, and in particular in the vicinity of electrical installations such as transformers, interference may arise. Thus, in a second embodiment, the link between the electronic control unit 1' and the suit 7 is provided by wire only, and no transmitter 30 is provided. Under such circumstances, the microprocessor applies a signal of determined potential to a terminal of the reciever card 8 via the connection, and it maintains said voltage while the device is in operation. If this signal disappears by virtue of the connection being ruptured, firing takes place. As a safety measure, this link is preferably duplicated. To this end, as shown in FIG. 5, the single contactor shown in FIGS. 2a–2c is replaced by a set of three to five contactor pins 16' penetrating into female contactor 16a' enabling the suit to be diagnosed on a continuous basis by the microprocessor. The three portions of the connection are fixed in the same manner as in FIG. 2. The male part 15 includes a stud 36 which penetrates into an orifice 37 of the intermediate part 13 to provide good guidance and to hold the intermediate part 13 in the male part 15 by means of balls. Naturally, in this case, there is only one explosion that inflates the suit to a pressure that is suitable for practically all kinds of accident.

Also, in the above-described system, inflation takes place only when the driver and/or passenger is ejected. Another common type of accident is the result of the motorbike skidding, because centrifugal force is greater than the grip of the motorbike on the ground. It is desirable for inflation to take place in this case also. To this end, a sensor 3a, is provided on the motorbike for sensing tilting thereof, which sensor delivers a signal to the control unit when the tilt of the motorbike exceeds a predetermined value indicating that skidding is about to take place. This mode of operation is made possible by the electronic link between the control unit 1' and the suit 7 as described above, with the connection remaining intact in this case. Under such conditions, inflation is caused if the control unit sends to the reciever card 8 information indicating "high speed" and "loss of grip" via the connection, or "high speed" and "connection separated".

What is claimed is:

1. A safety device for a motorcyclist, the device comprising an inflatable suit for protecting the motorcyclist from contact when separated from a motorcycle, inflation of the suit being controlled by firing a pyrotechnic capsule, the safety device comprising:

an electronic control unit securable to the motorcycle and at least one sensor coupled to the electronic control unit and for coupling to the motorcycle for sensing presence of travel parameters characteristic of operation of the motorcycle, the electronic control unit being controllably coupled to a radio transmitted;

a connector that is detachable under a given traction force, connecting the control unit to the suit such that rupture o the connector provides a signal to the electronic control unit;

wherein the suit comprises inflatable chambers coupled to the pyrotechnic capsule and a radio receiver responsive to the radio transmitter for triggering firing of the pyrotechnic capsule; and, wherein the electronic control unit is operable upon rupture of the detachable connector by application of a given force to fire the pyrotechnic capsule by signaling over the radio transmitter, provided that the sensor is then sensing said travel parameters characteristic of operation of the motorcycle.

2. The safety device of claim 1, wherein the electronic control unit comprises an analog stage and a digital stage including a microprocessor and integrated circuits, the control unit adapted to be connected firstly to a coil of the motorcycle for sensing ignition, to a wheel sensor for sensing motorcycle motion, and to a tilt sensor for sensing tilt.

3. The safety device according to claim 2, wherein the connector comprises a male part, a female part releasably engageable manually with the male part, and an intermediate part including at least one contactor pin, the male part being retained in the female part by hooks and by catches, the intermediate part being normally engaged with one of the male part and the female part and disengaged by application of said given traction force, the detachable connector being ruptured by separation of the motorcyclist from the motorcycle, and the electronic control unit firing the pyrotechnic device provided said travel parameters indicate that the motorcycle is then in operation.

4. The safety device according to claim 2, wherein the connector includes at least three contactor pins and the control unit is responsive to signals through the contactor pins.

5. The safety device according to claim 1, further comprising a relay arranged to permit or preclude operation of the motorcycle, the relay being operated by the electronic control unit to constitute an antitheft device requiring a starting code to be input by the motorcyclist.

6. A device according to claim 1, wherein the control unit includes a microprocessor, memories for storing main parameters of motorcycle travel, and wherein the microprocessor is coupled to a serial data output.

7. The safety device according to claim 1, wherein the suit comprises, a firing system including the pyrotechnic capsule, coupled to a supply (10) of compressed gas and an air distributor in communication with a set of chambers that are isolated from one another, the chambers being provided with non-return valves.

8. In combination, a motorcycle and a safety device for a motorcyclist, the device comprising an inflatable suit for protecting the motorcyclist from contact when separated from the motorcycle, inflation of the suit being controlled by firing a pyrotechnic capsule, the safety device comprising:

an electronic control unit secured to the motorcycle and at least one sensor coupled to the electronic control unit and to the motorcycle for sensing presence of travel parameters characteristic of operation of the motorcycle, the electronic control unit being controllably coupled to a radio transmitter;

a connector that is detachable under a given traction force, connecting the control unit to the suit such that rupture of the connector provides a signal to the electronic control unit;

wherein the suit comprises inflatable chambers coupled to the pyrotechnic capsule and a radio receiver responsive to the radio transmitter for triggering firing of the pyrotechnic capsule;

wherein the electronic control unit is operable upon rupture of the detachable connector by application of a given force to fire the pyrotechnic capsule by signaling over the radio transmitter, provided that the sensor is then sensing said travel parameters characteristic of operation of the motorcycle; and, wherein the electronic control unit is disposed at a protected location of the motorcycle, and the receiver, a firing system, and a gas cylinder are secured to the suit and connected thereto.

9. The combination according to claim 8, wherein the control unit transmits a radio signal after the connector has been ruptured, and calculates and controls a duration of chamber inflation as a function of a speed of the motorcycle at a time of the rupture, the firing system including two pyrotechnic capsules that are fired in succession.

* * * * *